(12) United States Patent
Dhayni

(10) Patent No.: US 9,306,789 B2
(45) Date of Patent: Apr. 5, 2016

(54) ESTIMATION OF CFO BASED ON RELATIVE VALUES OF FREQUENCY BINS CORRESPONDING TO USED SUBCARRIERS OF RECEIVED PREAMBLE SYMBOLS FOR OFDM SYSTEMS

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/428,022

(22) PCT Filed: Oct. 10, 2013

(86) PCT No.: PCT/EP2013/071199
§ 371 (c)(1),
(2) Date: Mar. 13, 2015

(87) PCT Pub. No.: WO2014/057055
PCT Pub. Date: Apr. 17, 2014

(65) Prior Publication Data
US 2015/0312079 A1    Oct. 29, 2015

(30) Foreign Application Priority Data
Oct. 12, 2012    (EP) .................................... 12306259

(51) Int. Cl.
*H04L 27/06* (2006.01)
*H04L 27/26* (2006.01)

(52) U.S. Cl.
CPC ........ *H04L 27/2662* (2013.01); *H04L 27/2657* (2013.01); *H04L 27/2672* (2013.01)

(58) Field of Classification Search
CPC .................... H04L 27/2657; H04L 2027/003; H04L 2027/0065; H04L 27/2332; H04L 27/0014; H04L 1/06; H04L 25/0204; H04B 1/123; H04B 7/002; H04B 1/109
USPC .................................. 375/259–285, 316–350
See application file for complete search history.

(56) References Cited

U.S. PATENT DOCUMENTS 6,658,063 B1 *   12/2003   Mizoguchi .......... H04L 27/2657
                                                       375/260
7,869,497 B2 *    1/2011   Benvenuto ........ H04L 25/03146
                                                       375/222

(Continued)

FOREIGN PATENT DOCUMENTS

EP          0 869 648 A2      10/1998
EP          0 998 085 A1       5/2000

(Continued)

OTHER PUBLICATIONS

International Search Report issued in corresponding International application No. PCT/EP2013/071199, date of mailing of report Nov. 5, 2013.

(Continued)

*Primary Examiner* — James M Perez
(74) *Attorney, Agent, or Firm* — Patent Portfolio Builders PLLC

(57) ABSTRACT

It is proposed a method for receiving and demodulating an orthogonal frequency division multiplexing signal received through a transmission channel (TC) by a receiver (RCV), comprising demultiplexing said signal to generate time symbols ($y_i(n)$) and performing a time-to-frequency conversion of these time symbols to generate frequency bins ($Y_i(k)$) corresponding to received symbols, the received symbols comprising preamble symbols. The method comprises: Determining an estimated carrier frequency offset on the basis of frequency bins corresponding to used subcarriers of the preamble symbols; Applying said estimated carrier frequency offset to the time symbols so as to correct the carrier frequency of these received symbols.

11 Claims, 3 Drawing Sheets

(56) References Cited

U.S. PATENT DOCUMENTS

| | | | |
|---|---|---|---|
| 2003/0161428 A1* | 8/2003 | Garrett | H04L 27/2675 375/368 |
| 2004/0005022 A1* | 1/2004 | Zhu | H04L 27/2675 375/365 |
| 2008/0260076 A1* | 10/2008 | Lai | H04L 27/2657 375/344 |
| 2011/0044408 A1* | 2/2011 | Ahmad | H04L 27/2675 375/340 |
| 2011/0293040 A1* | 12/2011 | Dupont | H03H 21/0018 375/316 |
| 2012/0134398 A1* | 5/2012 | Gamage | H04L 27/2666 375/224 |

FOREIGN PATENT DOCUMENTS

| | | |
|---|---|---|
| JP | 7-95175 A | 4/1995 |
| JP | H09224015 A | 8/1997 |
| WO | 2006/000614 A1 | 1/2006 |
| WO | 2010/057975 A2 | 5/2010 |

OTHER PUBLICATIONS

Extended European Search Report issued in corresponding European application No. EP 12 30 6259, date of completion of the search Mar. 12, 2013.

Extended European Search Report in corresponding European Application No. 12306259.8 dated Mar. 18, 2013.

Response dated Apr. 3, 2014 to Extended European Search Report in corresponding European Application No. 12306259.8 dated Mar. 18, 2013.

Office Action in corresponding European Application No. 12 306 259.8 dated May 20, 2014.

Response dated Jul. 30, 2015 to Office Action in corresponding European Application No. 12 306 259.8 dated May 20, 2014.

* cited by examiner

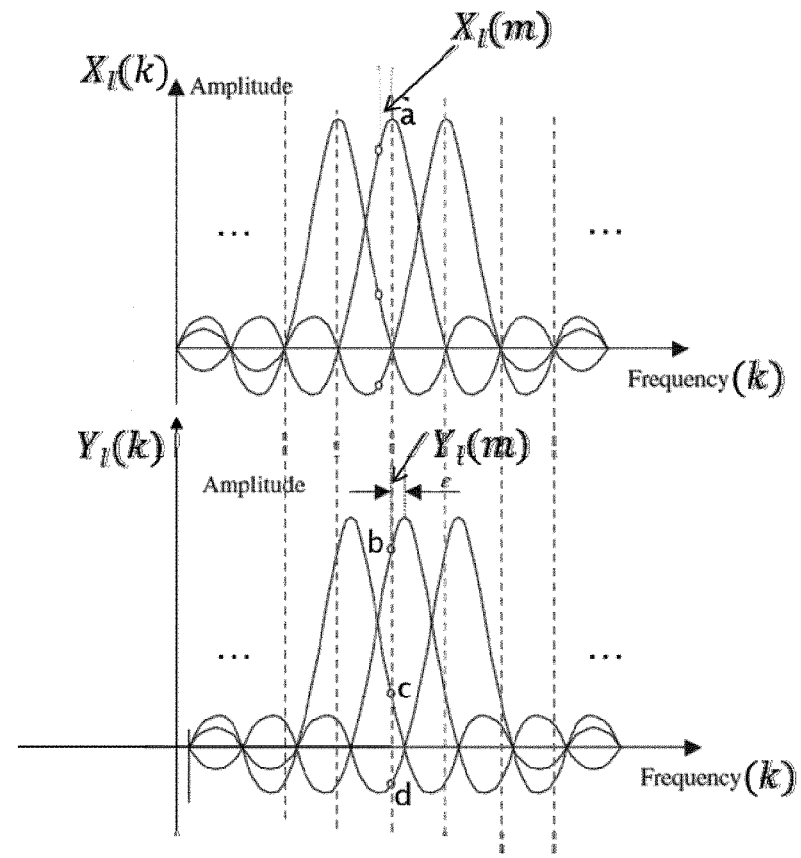
Fig. 3a
Fig. 3b
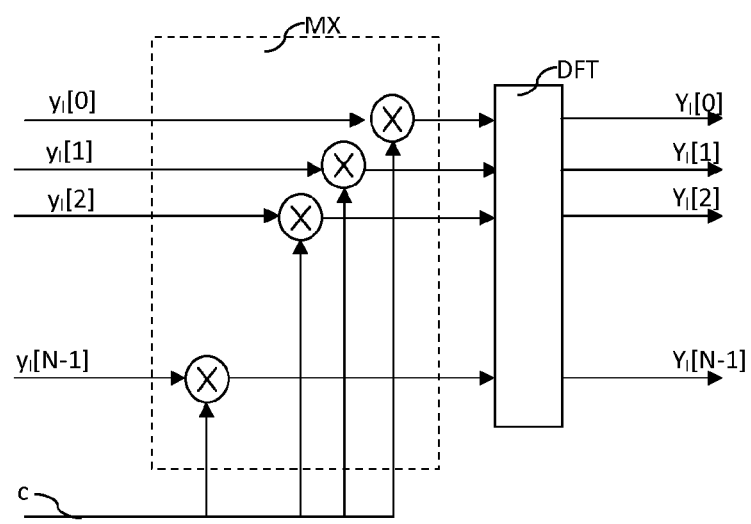
Fig. 4

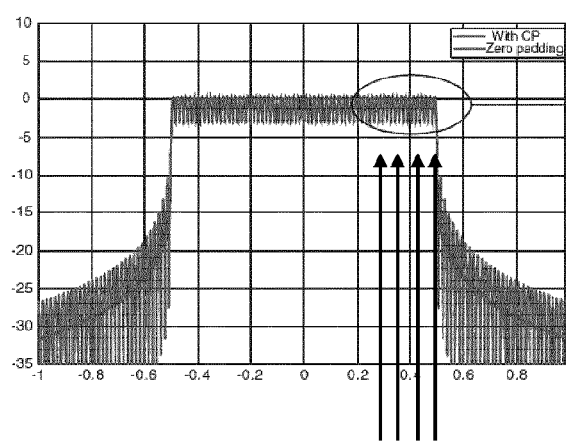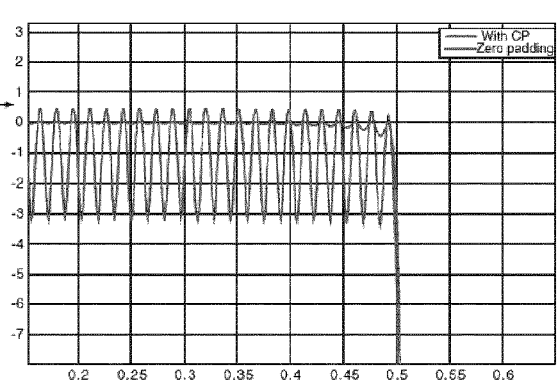
Fig. 5a                    Fig. 5b

ESTIMATION OF CFO BASED ON RELATIVE VALUES OF FREQUENCY BINS CORRESPONDING TO USED SUBCARRIERS OF RECEIVED PREAMBLE SYMBOLS FOR OFDM SYSTEMS

FIELD OF THE INVENTION

The invention relates to the field of multicarrier communications systems and more particularly to Orthogonal Frequency-Division Multiplexing (OFDM) systems including wireless OFDM systems

BACKGROUND OF THE INVENTION

Orthogonal Frequency-Division Multiplexing (OFDM), also referred to as "multi-carrier modulation" (MCM) or "discrete multi-tone modulation" (DMTM), splits up and encodes high-speed incoming serial data, modulating it over a plurality of different carrier frequencies (called "subcarriers") within a communication channel to transmit the data from one user to another. The serial information is broken up into a plurality of sub-signals that are transmitted simultaneously over the subcarriers in parallel.

By spacing the subcarrier frequencies at intervals of the frequency of the symbols to transmit, the peak power component of each modulated subcarrier lines up exactly with zero power components of the other modulated subcarriers, thereby providing orthogonality (independence and separability) of the individual subcarriers. This allows a good spectral efficiency (close to optimal) and minimal inter-channel interference (ICI), i.e. interferences between the subcarriers.

For these reasons, OFDM is used in many applications. Many digital transmission systems have adopted OFDM as the modulation technique such as digital video broadcasting terrestrial TV (DVB-T), digital audio broadcasting (DAB), terrestrial integrated services digital broadcasting (ISDB-T), digital subscriber line (xDSL), WLAN systems, e.g. based on the IEEE 802.11, cable TV systems, etc.

However, the advantage of the OFDM can be useful only when the orthogonality is maintained. In case the orthogonality is not sufficiently warranted by any means, its performance may be degraded due to inter-symbol interference (ISI) and inter-carrier interference (ICI).

This could happen as a result of synchronization issues between the clocks of the emitter and of the receiver within the OFDM system. These issues comprise:
Symbol Timing Offset (STO) and,
Carrier Frequency Offset (CFO)

Carrier Frequency Offset is notably caused by the mismatch of the oscillators of the emitter and of the receiver of the OFDM system, the nonlinear characteristic of the wireless channel and the Doppler shift when the emitter and/or the receiver are moving.

Even small frequency offsets can cause large signal to noise ratio (SNR) and bit-error-rate (BER) degradation. In particular, OFDM systems employing time-domain differential demodulation are very sensitive to the CFO.

Therefore, an accurate CFO estimation and correction algorithms should be employed to avoid performance degradation.

Several solutions have been proposed so far but they are not entirely satisfactory and efficient. These solutions have one or several of the following drawbacks:
Some techniques decrease the spectral efficiency by using dedicated transmitted data or sample sequences to train the CFO estimator at receiver's side. It is the case of many solutions based on pilot signals as for instance described in "Frequency Synchronization Algorithms for OFDM systems suitable for Communication over Frequency Selective Fading Channels" of Ferdinand Classen and Heinrich Meyr, In Proceedings of the Vehicular Technology Conference (VTC'97).
Some techniques are not accurate enough.
Some techniques require complex implementation.
Some technique implies analog treatment, leading to important silicon overhead.
Some techniques are not fully compliant with OFDM standards (like WLAN, LTE . . . )

There is thus a need for a solution permitting to improve the situation by providing a better estimation of the CFO.

SUMMARY OF THE INVENTION

An object of embodiments of the present invention is to alleviate at least partly the above mentioned drawbacks.

This is achieved with a method for receiving and demodulating an orthogonal frequency division multiplexing signal received through a transmission channel by a receiver, comprising demultiplexing said signal to generate time symbols and performing a time-to-frequency conversion of said time symbols to generate frequency bins corresponding to received symbols, said received symbols comprising preamble symbols, and said method comprising:

Determining an estimated carrier frequency offset $\hat{\epsilon}$ on the basis of frequency bins corresponding to used subcarriers of said preamble symbols;

Applying said estimated carrier frequency offset $\hat{\epsilon}$ to said time symbols so as to correct the carrier frequency of said received symbols.

According to embodiments of the invention, the method can comprise one or several of the following features:

said estimated carrier frequency offset $\hat{\epsilon}$ can be determined by comparing said frequency bins corresponding to said used subcarriers said estimated carrier frequency offset can be determined by comparing to each other the first and the last frequency bins corresponding to said used subcarriers.

a frequency corrective signal can be determined from said estimated carrier frequency offset and applied to said time symbols.

said frequency corrective signal is a sine wave signal at a frequency determined by said estimated carrier frequency offset.

said frequency corrective signal is mixed to said time symbols.

a frequency corrective signal (c) is determined from said estimated carrier frequency offset and provided to said time-to-frequency convertor.

Another aspect of the invention is a computer program product comprising a computer readable medium, having thereon a computer program comprising program instructions, the computer program being loadable into a data-processing unit and adapted to cause execution of the method previously described when the computer program is run by the data-processing unit.

Another aspect of the invention is a receiver for receiving and demodulating an orthogonal frequency division multiplexing signal received from a transmission channel, comprising a receiving function module adapted for demultiplexing said signal to generate time symbols and performing a time-to-frequency conversion of said time symbols to generate frequency bins corresponding to received symbols, said received symbols comprising preamble symbols, and said receiver further comprising a carrier frequency offset estimator for determining an estimated carrier frequency offset $\hat{\epsilon}$ on the basis frequency bins corresponding to used subcarriers of said preamble symbols; and applying said estimated carrier frequency offset to said time symbols so as to correct the carrier frequency of said received symbols.

According to embodiments of the invention, the receiver can comprise one or several of the following features:

said estimated carrier frequency offset is determined by comparing said frequency bins corresponding to said used subcarriers together.

said estimated carrier frequency offset is determined by said carrier frequency offset estimator by comparing to each other the first and the last frequency bins corresponding to said used subcarriers.

said carrier frequency offset estimator comprises a frequency correcting module to determine said frequency corrective signal from said estimated carrier frequency offset $\hat{\epsilon}$ and applied to said time symbols.

said frequency corrective signal is a sine wave signal at a frequency $F_{FC}$ determined by said estimated carrier frequency offset $\hat{\epsilon}$, so that $F_{FC}=|\hat{\epsilon}|*\Delta f$ Hz, where $\Delta f$ is the inter subcarrier frequency.

said frequency corrective signal is mixed to said time symbols before entering said time-to-frequency convertor.

said carrier frequency offset estimator comprises a frequency correcting module to determine a frequency corrective signal from said estimated carrier frequency offset and to provide said frequency corrective signal to said time-to-frequency convertor.

Further features and advantages of embodiments of the invention will appear from the following description of some embodiments of the invention, given as non-limiting examples, with reference to the accompanying drawings listed hereunder.

BRIEF DESCRIPTION OF THE DRAWINGS

FIGS. 3a and 3b illustrate a simplified example of transmitted OFDM spectrum.

FIG. 4 is a detailed view of the mixing circuitry according to an embodiment of the invention.

FIGS. 5a and 5b show an example of a signal spectrum at the output of a time-to-frequency converter.

DETAILED DESCRIPTION OF EMBODIMENTS OF THE INVENTION

Figure 1:
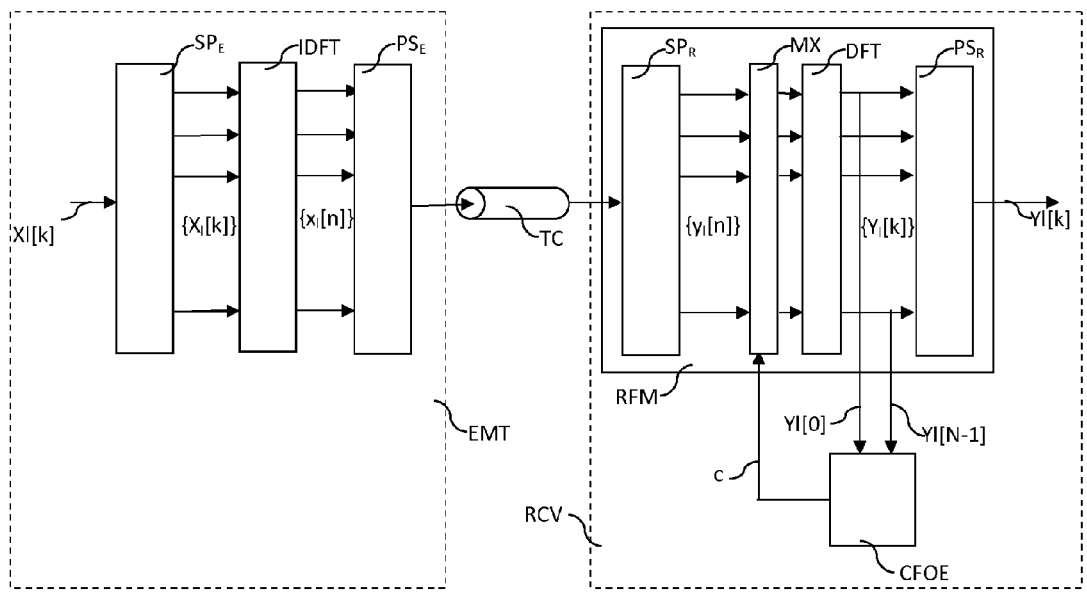
FIG. 1 shows a simplified high-level block diagram of an OFDM system.

The FIG. 1 illustrates a simplified and high-level block diagram of an OFDM system comprising an emitter EMT and a receiver RCV connected by a communication channel TC. This communication channel is usually (but not necessarily) wireless and perturbed by noise.

The principle of this OFDM system consists in transmitting several symbols (or signal) in parallel by assigning to each of them a different carrier, each carrier being orthogonal to the others. The number of carriers (or subcarriers) depends on the total bandwidth and on the duration of a symbol (i.e. the size of the time window in which the receiver can capture the transmitted symbols).

The symbols to be transmitted, initially in the frequency domain, are transposed into the time domain and modulated for transmission over the communication channel CC. The receiver RCV transposes the received signals back to the frequency domain to extract the transmitted symbols.

More precisely, the symbols $X_l[k]$ to be transmitted at emitter EMT side are first appropriately encoded and then sent to a serial-to-parallel transformer $SP_E$. This function blocks aims in extracting from a symbol, a number N of individual values $X_l[k]$, where "k" ranges from 1 to N−1 and "l" represents the ordinal number of the OFDM symbol to be transmitted.

This number N is equal to the number of subcarriers used for the transmission over the communication channel CC. It depends on the standard. For instance according to WLAN 802.11a (on which relies the embodiment depicted on FIG. 5a), 52 subcarriers are used (48 data subcarriers+4 pilot subcarriers), and 12 (6 on the "left" and 6 on the "right") subcarriers are not used (zero subcarriers).

Here and in the following descriptions, the variable k will be used for the frequency domain and the variable n for time domain.

In the FIG. 1, the curly brackets indicate a set of individual symbols associated with arrows. They are used to prevent having references for each arrow and helps simplifying and clarifying the FIG. 1.

The symbols $\{X_l[k]\}$ which are outputted by the serial-to-parallel transformer $SP_E$ are provided to a frequency-to-time transformer IDFT. This frequency-to-time transformer can perform an inverse discrete Fourier Transform of the symbols $\{X_l[k]\}$ to generate symbols $\{x_l[n]\}$ in the time domain. These symbols $\{x_l[n]\}$ are then multiplexed by the parallel-to-serial transformer $PS_E$ to produce a signal transmitted over the transmitted channel TC.

The transmitted channel can be associated with a transfer function $h_l(n)$. It represents the channel multipath behavior, delay, and complex attenuation. The time-domain transfer function (also called channel impulse response) may vary over time (from one OFDM symbol to another) and is therefore indexed by the number l of the transmitted symbol. The time domain transfer function $h_l(n)$ represents a multipath channel model and is therefore indexed by the number n representing the time delay of each of the considered paths of the multipath model.

The multiplexer $PS_E$ modulates the orthogonal subcarriers by the symbols to be transmitted.

The transmitted OFDM symbol $x_l(n)$ signal spectrum is the sum in the frequency domain of the orthogonal subcarrier sin c functions that are superposed over each other. The individual symbols can be independently modulated by using different types of modulations techniques, like for instance QAM (Quadrature Amplitude Modulation) or PSK (Phase-Shift Keying).

The FIGS. 3a and 3b illustrate a simplified example of such a transmitted OFDM spectrum at the emitter's side (FIG. 3a) and at receiver's side (FIG. 3b) according to the prior art. These explanations aim at better understanding the problem solved by the invention.

In this simplified example, only 3 subcarriers are depicted in order to keep the figure easy to read. Each subcarrier corresponds to a sin c function which peak matches with a frequency bin associated with an orthogonal modulation frequency. The frequency bins are depicted with vertical dotted lines. The sin c function is defined as sin c(x)=sin(π·x)/π·x (in its normalized format).

Taking the example of WLAN 802.11a/g, the frequency bins are located at −26*312.5 kHz, −25*312.5 kHz . . . , 25*312.5 kHz, 26*312.5 kHz. (the 0*312.5 kHz subcarrier is not used)

In the FIG. 3a, the symbol $X_l(m)$ corresponds to a value "a" which is at the peak of the corresponding subcarriers and thus independent of the other subcarriers.

In the FIG. 3b, the subcarriers are shifted by a carrier frequency offset (CFO) $\epsilon$ in the frequency domain. As a consequence, the peaks of the sin c functions do not match anymore the frequency bins. The received symbol $Y_l(m)$ is not equal to "a" anymore. Instead, the received signal is the addition of the values of the subcarriers, so as $Y_l(m)=b+c+d$. In other words, the received signal depends on the other subcarriers (c, d). The orthogonality of the subcarriers is violated, due to the presence of the carrier frequency offset $\epsilon$; and the received and decoded symbols are in error.

According to the invention, a CFO compensation is put in place so as to determine the right values of the received symbols.

The symbols $y_l(n)$ are received by the receiver RCV with, potentially such a CFO. The CFO can be positive or negative. No information can be determined by the receiver RCV about the nature of the transmission channel to help valuing the CFO. In other words, at the moment of CFO estimation, we do not have information about the transfer function of the channel. Therefore, the receiver RCV should rely on blind determination techniques to compensate the effects of the Carrier Frequency Offset.

The received symbols can be expressed with the typical following equation:

$$y_l[n] = \frac{1}{N}\sum_{k=0}^{N-1} H_l[k] X_l[k] e^{j2\pi(k+\epsilon)(n/N)} + z_l[n]$$

Where:
n, k represent variable over the time and frequency domains respectively.
$H_l$ is the channel transfer function during the $l^{th}$ symbol.
N is the number of subcarriers (which depends on the standard that is used).
$z_l$ is the time domain additive noise of the channel during the transmission of the $l^{th}$ symbol.
k+$\epsilon$ corresponds to the frequency shifted by the carrier frequency offset $\epsilon$.

The receiver RCV comprises a receiving function module RFM which generates demodulated symbols Yl[k] from the received symbols stream yl[n]. The demodulated symbols can then be passed over to other circuitry of the receiver RCV (not depicted).

The receiving function module RFM may perform different steps which are usual in OFDM systems but may be subject to variations and different implementations.

The high-level schema of the FIG. 1 shows a possible implementation where the receiving function module RFM comprises:
a serial-to-parallel convertor or demultiplexer $SP_R$, which parallelizes the received symbol to a set of time symbols $\{y_l(n)\}$.
A time-to-frequency transformer DFT. This transformer can perform a discrete Fourier Transform of the time symbols $\{y_l(n)\}$ to generate a set of received frequency bins $\{Y_l(k)\}$ in the frequency domain, corresponding to determined subcarriers.
A parallel-to-serial convertor $PS_R$ to produce symbols $Y_l(k)$ made of these received frequency bins $\{Y_l(k)\}$. These symbols can then be transmitted to other circuitries of the receiver RCV (not depicted in the figure).

In order to perform these steps, the receiving function module RFM shares with the emitter EMT the same subcarriers frequencies, as well as the number of subcarriers N. They could have been communicated beforehand, or they may be set or tuned previously in both the emitter and receiver, for instance according to standards specifications.

The time-to-frequency transformer DFT uses as inputs a frequency correction signal c in order to correct the effect of the CFO within the transmission channel TC. This frequency correction signal c is provided by a carrier frequency offset estimator CFOE, which will be described later.

This frequency correction signal c can be a sine wave signal at a frequency equal to an estimated frequency of the carrier frequency offset (CFO). Several embodiments are possible.

For instance, the frequency correcting signal c can be mixed with the time symbol yl[0], yl[1], yl[2] . . . yl[N–1] before entering the time-to-frequency transformer DFT, within a mixing circuitry MX.

Such an implementation is close to the one described in the chapter 5 of the book "MIMO-OFDM Wireless Communications with Matlab", of Yong Soo Cho, Jaekwon Kim, Won Young Yang, Chung-Gu Kang, in connection with the FIG. 5.16.

The FIG. 4 shows the mixing circuitry with more details. We can see that each individual time symbol $y_l[m]$ is mixed with the frequency correcting signal c in the time domain.

Other embodiments are possible. According to some embodiments, the frequency correcting signal c can be provided to the time-to-frequency converter DFT, so as to avoid mixing signals in the time domain.

Further, the receiving function module RFM can comprise other apparatuses and circuitries to enhance the OFDM demodulation and decoding schemes, and the embodiment depicted in FIG. 1 may be regarded as an over simplification. Nonetheless, it is sufficient to the man skilled-in-art to situation the invention and how it interacts with the known OFDM systems and processes.

As explained earlier, the receiver RCV also comprises a CFO estimator CFOE. It aims in determining a good estimated value of the carrier frequency offset as perceived by the receiver RCV.

This estimation is performed during the reception of preamble symbols. Preamble symbols can be sent at the beginning of an OFDM packet, so as to tune the receiver RCV and facilitate its synchronization. This is notably the case with 802.11 OFDM standards.

This estimation can be made each time new preamble symbols are received (i.e. for each OFDM packets) since the CFO can vary over time.

According to the invention, the estimations are based on the relative values of the frequency bins generated by the time-to-frequency convertor DF, which corresponds to used subcarriers for the preamble symbols. By "relative", it is meant that the generated frequency bins $\{Y_l(n)\}$ are not considered for their absolute values but compared to each other's.

These comparisons aim in identifying an individual used subcarrier corresponding to a frequency bin of lower amplitude. These frequency bins of lower amplitude can be at both extremities of the symbol signal spectrum outputted by the time-to-frequency convertor DFT.

The FIGS. 5a and 5b show an example of a signal spectrum at the output of the time-to-frequency convertor DFT. The FIG. 5b is a zoomed display of the zone circled in the FIG. 5a. The x-axis is the frequency domain (normalized with respect to the bandwidth of the OFDM signal). The y-axis is the power (in dBm) of the spectrum of the $l^{th}$ OFDM symbol $Y_l(k)$.

This spectrum is the sum in the frequency domain of all the sine functions corresponding to the N orthogonal subcarriers. Two curves are depicted: the one showing the most amplified sine waves corresponds to an implementation using cyclic prefixes; the one showing less waves corresponds to an OFDM symbol spectrum using zero-padding.

The vertical arrows illustrate the frequency bins at receiver's side. The intersection of the vertical lines following these arrows and the spectrum gives the amplitude values of the output bins of the time-to-frequency converter DFT.

Regardless of the chosen option, it has been remarked by the inventor that the frequency bin that corresponds to the last used subcarrier corresponds to lower amplitude due to a carrier frequency offset CFO. In this example, the CFO is negative ($\epsilon$<0) and the frequency bin corresponding the last used subcarrier $Y_l[N-1]$) is impacted, whereas the bins of the other used subcarriers have a constant and high amplitude.

In the situation where the CFO is positive ($\epsilon$>0), only the frequency bin corresponding to the first used subcarrier of the lth received OFDM symbol $Y_l[0]$ is impacted and the other bins correspond to a constant and higher amplitude.

In the ideal case, i.e. when there is no carrier frequency offset due to the transmission channel TC, all the values $Y_l(k)$ are equal for preamble symbols encoded in BPSK or DQPSK (respectively "Binary Phase Shift Keying" and "Differential Quadrature Phase Shift Keying")

On the opposite, the bigger is the difference between the first or last value and the other values, the larger is the CFO in absolute value.

As a consequence of these experiments and reasoning, an embodiment of the invention can consists in comparing the two extreme frequency bins (i.e. the two extreme values of the symbols Yl[k]) to each other during the reception of preamble symbols. This comparison is then used in order to compensate for the CFO when receiving the subsequent symbols. This process can be done OFDM packet by OFDM packet.

In other words, the CFO estimator CFOE can take as input $Y_l[0]$ and $Y_l[N-1]$ frequency bins and perform a comparison of their values, for each value of "l" of the preamble symbols.

In general, a packet is made of a preamble and data. The preamble may comprise a Long Training Field (LTF), which is encoded according to BPSK or QBPSK schemes.

According to embodiments of the invention, this Long Training Field can be used to estimate the CFO.

Figure 2:
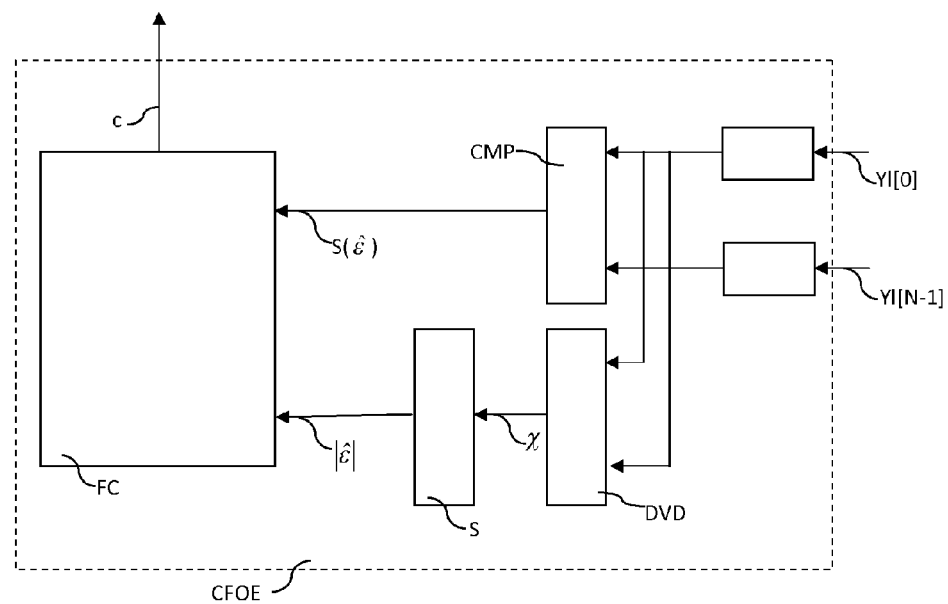
FIG. 2 illustrates a possible block diagram of the carrier frequency offset estimator in accordance with an embodiment of the invention.

The FIG. 2 illustrates a possible embodiment of the carrier frequency offset estimator CFOA.

The values $Y_l[0]$ and $Y_l[N-1]$ are complex numbers with real and imaginary parts. They are first normalized so as to provide 2 norms (or modules) A, B respectively. These 2 norms (magnitudes) A, B are then provided to a comparator CMP and to a divider DVD.

The comparator CMP simply compares the 2 norms A and B and provides a sign $s(\hat{\epsilon})$ for the estimated carrier frequency offset $|\hat{\epsilon}|$, determined by:
If A>B, $s(\hat{\epsilon})$ is positive
If A<B, $s(\hat{\epsilon})$ is negative.
The divider DVD determines a ratio of the norms according to their relative values, i.e.:
If A>B, $\chi$=B/A
If B>A, $\chi$=A/B
Then, the result $\chi$ is provided to the functional module S which computes the norm of the estimated carrier frequency offset $|\hat{\epsilon}|$, as $|\hat{\epsilon}|=\sin c^{-1}(\chi)$.

A frequency correction module FC takes this norm $|\hat{\epsilon}|$ and the sign $s(\hat{\epsilon})$ as inputs so as to determine the frequency corrective signal c.

According to an embodiment of the frequency correction module FC, it can generate a sinusoidal wave at a frequency $F_{FC}=|\hat{\epsilon}|*312.5$ kHz as $|\hat{\epsilon}|$ is a normalized value with respect to the inter subcarrier frequency $\Delta f$ ($\Delta f$=312.5 kHz in all 802.11 OFDM WLAN standards).
If the CFO is positive, $F_{FC}$ down-converts the received signal by mixing down the received signal in the time domain (i.e. before the IFFT block in the receiver).
If the CFO is negative, $F_{FC}$ up-converts the received signal by mixing up the received signal in the time domain (i.e. before the IFFT block in the receiver).
Mixing-up and mixing-down can have different implementations in RF or baseband.

In this embodiment, a complex mixing is performed. Using a complex multiplier before the input of the S/P converter of the receiver is a well-known technique.

Functionally, the frequency correction module FC is thus performing a classical task and may be implemented in various ways accessible to the man skilled-in-the-art. For this reason, it will not be further detailed, as the invention is independent of the actual implementation of this functional module.

As explained earlier, the frequency corrective signal c is provided as input of the receiving function module RFM.

The invention has been described with reference to preferred embodiments; but other embodiments and variations are possible while being within the scope of the claimed invention.

The invention claimed is:

1. A method for receiving and demodulating an orthogonal frequency division multiplexing signal received through a transmission channel by a receiver, the method comprising:
    Demultiplexing said signal to generate time symbols;
    Performing a time-to-frequency conversion of said time symbols to generate frequency bins corresponding to received symbols, said received symbols comprising preamble symbols;
    Determining an estimated carrier frequency offset by comparing to each other only the first and the last frequency bins corresponding to used subcarriers of said preamble symbols; and
    Applying a corrective value based on said estimated carrier frequency offset, to said time symbols, so as to correct the carrier frequency of said received symbols.

2. A method according to claim 1, wherein the corrective value is a frequency corrective signal determined from said estimated carrier frequency offset.

3. A method according to claim 2, wherein said frequency corrective signal is a sine wave signal at a frequency determined by said estimated carrier frequency offset.

4. A method according to claim 3, wherein said frequency corrective signal is mixed to said time symbols.

5. A method according to claim 1, wherein the corrective value is a frequency corrective signal determined from said estimated carrier frequency offset, and the frequency corrective signal is applied to said time symbols by said time-to-frequency convertor.

6. A computer program product comprising a non-transitory computer readable medium, having thereon a computer program comprising program instructions, the computer program being loadable into a data-processing unit and when the computer program is run by the data-processing unit the program instructions cause the data-processing unit to be configured to:
    demultiplex a received orthogonal frequency division multiplexing signal to generate time symbols;

perform a time-to-frequency conversion of said time symbols to generate frequency bins corresponding to received symbols, said received symbols comprising preamble symbols;

determine an estimated carrier frequency offset by comparing to each other only the first and the last frequency bins corresponding to used subcarriers of said preamble symbols; and apply a corrective value based on said estimated carrier frequency offset, to said time symbols, so as to correct the carrier frequency of said received symbols.

7. A receiver for receiving and demodulating an orthogonal frequency division multiplexing signal received from a transmission channel, the receiver comprising:

a receiving unit configured for:

demultiplexing said signal to generate time symbols; and performing a time-to-frequency conversion of said time symbols to generate frequency bins corresponding to received symbols, said received symbols comprising preamble symbols; and a carrier frequency offset estimator configured for determining an estimated carrier frequency offset by comparing to each other only the first and the last frequency bins corresponding to used subcarriers of said preamble symbols; and the receiving unit is further configured for applying a corrective value based on said estimated carrier frequency offset, to said time symbols, so as to correct the carrier frequency of said received symbols.

8. A receiver according to claim 7, wherein the corrective value is a frequency corrective signal determined from said estimated carrier frequency offset and applied to said time symbols.

9. A receiver according to claim 8, wherein said frequency corrective signal is a sine wave signal at a frequency FFC determined by said estimated carrier frequency offset so that FFC=*$\Delta$f Hz, where $\Delta$f is the inter subcarrier frequency.

10. A receiver according to claim 9, wherein said frequency corrective signal is mixed to said time symbols before entering said time-to-frequency convertor.

11. A receiver according to claim 7, wherein the corrective value is a frequency corrective signal determined from said estimated carrier frequency offset, and said frequency corrective signal is applied to said time symbols by said time-to-frequency convertor.

* * * * *